US010432564B2

(12) United States Patent
Oh et al.

(10) Patent No.: US 10,432,564 B2
(45) Date of Patent: Oct. 1, 2019

(54) METHOD AND APPARATUS FOR PROVIDING USER EXPRESSION SERVICE IN COMMUNICATION SYSTEM

(71) Applicant: Samsung Electronics Co., Ltd, Gyeonggi-do (KR)

(72) Inventors: Gyu-Bong Oh, Gyeonggi-do (KR); Kyung-Tak Lee, Gyeonggi-do (KR); Jongsoo Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 15/038,725

(22) PCT Filed: Nov. 19, 2014

(86) PCT No.: PCT/KR2014/011131
§ 371 (c)(1),
(2) Date: May 23, 2016

(87) PCT Pub. No.: WO2015/076556
PCT Pub. Date: May 28, 2015

(65) Prior Publication Data
US 2016/0330157 A1      Nov. 10, 2016

(30) Foreign Application Priority Data

Nov. 21, 2013   (KR) ........................ 10-2013-0141960

(51) Int. Cl.
*H04L 12/58* (2006.01)
*H04L 12/64* (2006.01)
(Continued)

(52) U.S. Cl.
CPC .......... *H04L 51/18* (2013.01); *H04L 12/6418* (2013.01); *H04L 51/32* (2013.01);
(Continued)

(58) Field of Classification Search
CPC ......... H04L 12/64; H04L 51/32; H04L 67/28; H04L 67/30
(Continued)

(56) References Cited

U.S. PATENT DOCUMENTS

2007/0208837 A1   9/2007 Tian et al.
2010/0222043 A1   9/2010 Dragt
(Continued)

FOREIGN PATENT DOCUMENTS

JP   2007-281964   10/2007
JP   2013-149262    8/2013
(Continued)

OTHER PUBLICATIONS

Supplementary European Search Report dated Jul. 20, 2017 in connection with European Patent Application No. 14 86 3783.
(Continued)

*Primary Examiner* — Glenford J Madamba

(57) ABSTRACT

The present invention relates to a method and an apparatus for proving a user expression service in a communication system. The method in a server may comprise the steps of: receiving, from a gateway connected to a contents server, a message requesting a user expression from a terminal of a user viewing contents; determining whether the user terminal prefers to receive the message requesting the user expression; if the user terminal prefers to receive the message requesting the user expression, delivering, to the user terminal, the message requesting the user expression; and receiving, from the user terminal, the message including user expression information and delivering the message to the gateway.

17 Claims, 10 Drawing Sheets

(51) Int. Cl.
　　　*H04L 29/06*　　(2006.01)
　　　*H04L 29/08*　　(2006.01)

(52) U.S. Cl.
　　　CPC ............ *H04L 67/28* (2013.01); *H04L 67/303* (2013.01); *H04L 67/306* (2013.01); *H04L 67/42* (2013.01)

(58) Field of Classification Search
　　　USPC ......................................................... 709/206
　　　See application file for complete search history.

(56) References Cited

U.S. PATENT DOCUMENTS

| | | |
|---|---|---|
| 2010/0332431 A1 | 12/2010 | Ribiere et al. |
| 2011/0202600 A1* | 8/2011 | Ramamoorthy ........ H04L 67/02 709/203 |
| 2011/0276410 A1* | 11/2011 | Hjelm .................... G06Q 30/02 705/14.66 |
| 2012/0005114 A1 | 1/2012 | Bank et al. |
| 2012/0166652 A1* | 6/2012 | Bouthemy .......... H04L 65/1016 709/227 |
| 2013/0275904 A1 | 10/2013 | Bhaskaran et al. |
| 2014/0380387 A1* | 12/2014 | Pattan ................... H04L 65/605 725/109 |

FOREIGN PATENT DOCUMENTS

| | | |
|---|---|---|
| KR | 10-0745809 | 8/2007 |
| KR | 10-0769024 | 10/2007 |
| KR | 2013-0009446 | 1/2013 |
| KR | WO2013089430 A1 * | 6/2013 |

OTHER PUBLICATIONS

Open Mobile Alliance, "Immersive Social Centre Requirements, Draft Version 1.0", Jan. 22, 2014, 29 pages.
International Search Report dated Feb. 25, 2015 in connection with International Application No. PCT/KR2014/011131; 5 pages.
Written Opinion of the International Searching Authority dated Feb. 25, 2015 in connection with International Application No. PCT/KR2014/011131; 8 pages.

* cited by examiner

METHOD AND APPARATUS FOR PROVIDING USER EXPRESSION SERVICE IN COMMUNICATION SYSTEM

CROSS-REFERENCE TO RELATED APPLICATION

The present application claims priority under 35 U.S.C. § 365 to International Patent Application No. PCT/KR2014/011131 filed Nov. 19, 2014, entitled "METHOD AND APPARATUS FOR PROVIDING USER INTENTION EXPRESSION SERVICE IN COMMUNICATION SYSTEM", and, through International Patent Application No. PCT/KR2014/01131, to Korean Patent Application No. 10-2013-0141960 filed Nov. 21, 2013, each of which are incorporated herein by reference into the present disclosure as if fully set forth herein.

TECHNICAL FIELD

The present disclosure relates to a method and an apparatus for providing a user expression service in a communication system, and more particularly, to a method and an apparatus for managing the user expression in an immersive social centre service.

BACKGROUND

Recently, there is a tendency for services based on the social networks in communication devices to rapidly increase. The social network refers to a network that is comprised of a user and other users who are related to the user's interests or activities. Services, which use the social networks, rapidly spread in order to: meet expression desires of individuals; share information with other users; and establish a relationship with other users.

However, since conventional social network services provide a function of merely transmitting and receiving data based on the network that is formed between user terminals, the services have limitations in satisfying the user's desire for various services to be provided.

SUMMARY

Accordingly, the embodiment of the present disclosure provides an immersive social centre (hereinafter, referred to as "ISC") service that provides content-viewing and communication between the users in an integrated form in order to thereby allow the users to experience more realistic media content.

Another embodiment of the present disclosure provides a method and an apparatus for managing the user expression for the content in the ISC service.

Another embodiment of the present disclosure provides a method and an apparatus for configuring preference information that shows whether or not the user terminal receives a user expression request message related to the ISC service.

Another embodiment of the present disclosure provides a method and an apparatus for determining whether or not to make a request to each user terminal for the user expression based on the preference information of the users in the content session of the ISC in the ISC server.

Another embodiment of the present disclosure provides a method and an apparatus for converting a message, which is received from the content provider, into an SIP message, which can be processed in the ISC system, in a gateway that connects the ISC system and the content provider.

Another embodiment of the present disclosure provides a method and an apparatus for determining whether or not to transmit a result of the user expression to each user terminal based on the preference information of the users in the content session of the ISC system in the ISC server.

According to the embodiment of the present disclosure, a method of a server for providing a user expression service in a communication system may include: receiving, from a gateway connected with a content server, a message that makes a request to a terminal of a user who is viewing content for a user expression; determining whether or not the user terminal prefers to receive the user expression request message; delivering, to the user terminal, the message requesting the user expression if the user terminal prefers to receive the user expression request message; and receiving, from the user terminal, a message, which contains user expression information, in order to thereby deliver the same to the gateway.

According to the embodiment of the present disclosure, a method of a terminal for providing a user expression service in a communication system may include: configuring whether or not to prefer to receive a user expression request message for content; receiving, from a server, a user expression request message for the content that is being viewed if the reception of the user expression request message is preferred; receiving an input of user expression information from a user; and transmitting, to the server, a message including the user expression information.

According to the embodiment of the present disclosure, a method of a gateway for providing a user expression service in a communication system may include: receiving, from a content server, a message that makes a request to a terminal of a user who is viewing specific content for a user expression; converting the message received from the content server into a message form that can be delivered in a system; and transmitting the converted user expression request message to a server that is associated with the user terminal.

According to the embodiment of the present disclosure, a method of a content server for providing a user expression service in a communication system may include: transmitting, to a gateway, a message that makes a request to a terminal of a user who is viewing content for a user expression; and receiving a user expression information collection result from the gateway, wherein the message requesting the user expression contains at least one of: the recipient address; the sender address; the object for the expression; a participating method for the expression; the deadline for the expression; or request information for user's confirmation on the reception.

According to the embodiment of the present disclosure, an apparatus of a server for providing a user expression service in a communication system may include: a transmitting/receiving unit configured to communicate with a gateway connected with a content server and with a user terminal; and a control unit configured to control functions of receiving, from the gateway, a message that makes a request to a terminal of a user who is viewing content for a user expression, determining whether or not the user terminal prefers to receive the user expression request message, delivering, to the user terminal, the message requesting the user expression if the user terminal prefers to receive the user expression request message, and receiving, from the user terminal, a message including user expression information in order to thereby deliver the same to the gateway.

According to the embodiment of the present disclosure, an apparatus of a terminal for providing a user expression service in a communication system may include: a transmitting/receiving unit configured to communicate with a server; and a control unit configured to control functions of configuring whether or not to prefer to receive a user expression request message for content, receiving, from the server, a user expression request message for the content that is being viewed if the reception of the user expression request message is preferred, receiving an input of user expression information from a user, and transmitting, to the server, a message including the user expression information.

According to the embodiment of the present disclosure, an apparatus of a gateway for providing a user expression service in a communication system may include: a transmitting/receiving unit configured to communicate with a content server and a server that is associated with a user terminal; and a control unit configured to control functions of receiving, from the content server, a message that makes a request to a terminal of a user who is viewing specific content for a user expression, converting the message received from the content server into a message form, which can be delivered in a system, and transmitting the converted user expression request message to the server associated with the user terminal.

According to the embodiment of the present disclosure, an apparatus of a content server for providing a user expression service in a communication system may include: a transmitting/receiving unit configured to communicate with a gateway; and a control unit configured to control functions of transmitting, to a gateway, a message that makes a request to a terminal of a user who is viewing content for a user expression, and receiving a user expression information collection result from the gateway, wherein the message requesting the user expression may contain at least one of: the recipient address; the sender address; the object for the expression; a participating method for the expression; the deadline for the expression; or request information for user's confirmation on the reception.

In the embodiment of the present disclosure, in order to provide an immersive social centre service for managing the user expression for the content, the user terminal may pre-configure whether or not to prefer to receive the user expression request message with respect to the ISC. It may further determine whether or not to make a request to each user terminal for the user expression based on the preference information of the users in the content session of the ISC in the ISC server so that a user expression request signal is selectively transmitted to the user who prefers the same in order to thereby provide a high-speed service while saving communication resources without wasting memory and in order to thereby improve the user's convenience. In addition, the gateway, which connects the content server and the ISC system, may convert a message received from the content server into an SIP message, which can be processed in the ISC system, in order to thereby provide the user expression service when viewing the content from various content servers. Furthermore, in the embodiment of the present disclosure, the result of the user expression may be provided to the user terminal in order to thereby provide various user experiences to the user.

DETAILED DESCRIPTION

Figure 1:
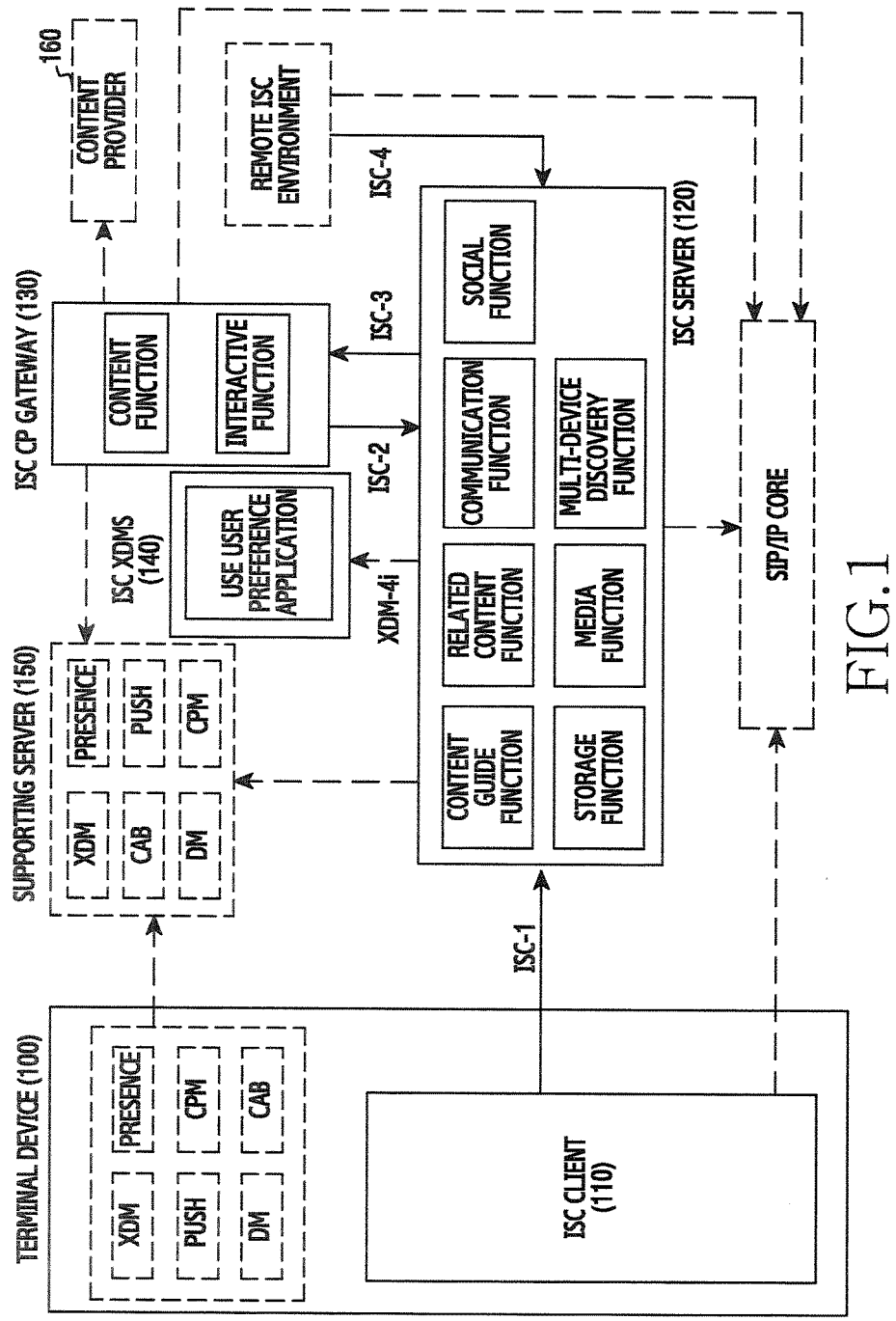
FIG. 1 is a view illustrating a conceptual structure of a system for providing an immersive social centre (ISC) service, according to the embodiment of the present disclosure.

Hereinafter, preferred embodiments of the present disclosure will be described with reference to the accompanying drawings. Further, in the following description of the present disclosure, a detailed description of known functions or configurations incorporated herein will be omitted when it may make the subject matter of the present disclosure rather unclear. Further, terms described later are defined in consideration of functions of the present disclosure, but may vary according to the intention or convention of a user or operator. Therefore, the definitions of the terms should be made based on the contents throughout the specification.

As used in various embodiments of the present disclosure, the expressions "have", "may have", "include" or "may include", and other conjugates refer to the existence of a corresponding disclosed function, operation, or constituent element, and do not limit one or more additional functions, operations, or constituent elements. Further, as used in various embodiments of the present disclosure, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

In various embodiments of the present disclosure, the expression "A or B" or "at least one of A or/and B" includes any or all of combinations of words listed together. For example, the expression "A or B" or "at least A or/and B" may include A, may include B, or may include both A and B.

While expressions including ordinal numbers, such as "first" and "second", as used in various embodiments of the present disclosure may modify various constituent elements, such constituent elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element may be termed a second element, and likewise a second element may also be termed a first element without departing from the scope of various embodiments of the present disclosure.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The expression "configured (or set) to", used in this specification, may be interchangeably used with, for example, "suitable for," "having the capacity to," "designed to," "adapted to," "made to," or "capable of" according to circumstances. The term "configured (or set) to" may not necessarily mean "specifically designed to" in hardware. Instead, in some cases, the expression "device configured to" may mean that the device "can ~" together with other devices or components. For example, the phrase "processor adapted (or configured) to perform A, B, and C" may mean a dedicated processor (e.g., embedded processor) for performing the corresponding operations or a generic-purpose processor (e.g., central processing unit (CPU) or application processor (AP)) that can perform the corresponding operations by executing one or more software programs stored in a memory device.

The terms as used in various embodiments of the present disclosure are merely for the purpose of describing particular embodiments and are not intended to limit the various embodiments of the present disclosure. As used herein, the singular forms are intended to include the plural forms as well, unless the context clearly indicates otherwise.

Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in the present disclosure.

The following description will be made of a method and an apparatus for managing the user expression in the immersive social centre service, which provides content-viewing and communication between the users in an integrated form.

FIG. 1 illustrates a conceptual structure of a system for providing the immersive social centre (ISC) service, according to the embodiment of the present disclosure.

Referring to FIG. 1, the system for providing the immersive social centre (ISC) service may be configured to include an ISC client 110, an ISC server 120, an ISC CP (Content Provider) gateway 130, an ISC XDMS (XML Document Management Server) 140, and a supporting server 150.

The ISC client 110 may be included in a terminal device 100, and may communicate with the ISC server 120. The ISC client 110 may communicate with other objects (e.g., the ISC server 120, the ISC CP gateway 130, a remote ISC environment, or the like) through an SIP (Session Initiation Protocol)/IP (Internet Protocol) core or directly.

The ISC client 110 transmits, to the ISC server 120, a request for: the registration of the ISC client 110 and the ISC user; the communication of the ISC users (for example, the transmission and reception of chat messages/files); functions (for example, add/remove viewing participants) related to a content viewing group (that is, a group of users who view the content together); the synchronization of content-viewing; checking the user equipment capability; the management of content-viewing information; the reception/management of media content; the management of a content list (e.g., live/non-live content, user-generated content, or a preview of content); the management of associated content, immersive experience-related functions (e.g., spatial configuration, continuous content-viewing, or the like); or media communication (e.g., media plane communication). In addition, the ISC client 110 may transmit, to the supporting server 150, the XML document management, the presence information management, the push message management, the converged IP messaging management, the equipment management, or converged address book management by the ISC equipment itself. Additionally, according to the embodiment of the present disclosure, the ISC client 110 may perform functions of: receiving a request for the user expression for the content that is being viewed; receiving information that expresses the intention for the content from the user; providing the input user expression information to the ISC server 120; and receiving, from the ISC server 120, expression results of other users who are viewing the content together in the group in order to thereby provide the same to the user.

The ISC server 120 is one of the network elements for the ISC service. The ISC server 120 receives a request of the ISC user from the ISC client 110, and processes the request. The main functions of the ISC server 120 include: the registration/mutual authentication of the ISC client 110; the creation of a content guide; the association and transmission of primary content and associated content; the storage and management of content; the management of multi-equipment; the management of a content viewing session and a communication session; the distribution of content; and the conveyance of social interaction and an immersive experience. Additionally, the ISC server 120 may process functions that are related to a request for the user expression for the content and to a response thereof.

The ISC CP gateway 130 enables real time, or non-real time, communication between the ISC user and the content provider. In addition, the ISC CP gateway 130 may receive, from the content provider, media content for the content-viewing or continuous content-viewing of the ISC client 110, and may provide the same to the ISC server 120. Additionally, the ISC CP gateway 130, according to the embodiment of the present disclosure, may process functions of: receiving the user expression request for the content from the content provider 160; and requesting, collecting, and aggregating expressions of the users who are viewing the content together in the group. The ISC CP gateway 130 may perform a function of converting a message, which is provided from the content provider 160, into an SIP message form, which can be delivered in the ISC system.

The ISC XDMS 140 manages the ISC user preference application usage. For example, the ISC XDMS 140 stores information that indicates ISC user's preference for the setting of a social relationship with respect to the communication session, the storing and sharing of a communication history, and the conveyance of intention. In addition, the ISC XDMS 140 may provide information indicating the ISC user's preference according to a request of the ISC server 120.

The supporting server 150, in addition to the preference, performs functions of: the XML document management (XDM) for accessing various application usage functions; PRS (Presence) for the presence information management; PUSH for the push message management; CPM (Converged IP Messaging) for the converged messaging management; DM (Device Management) for the equipment management; and CAB (Converged Address Book) for the converged address book management. That is, the supporting server 150 may store content, such as messages or files, which are transmitted and received between the users through the communication session.

Figure 2:
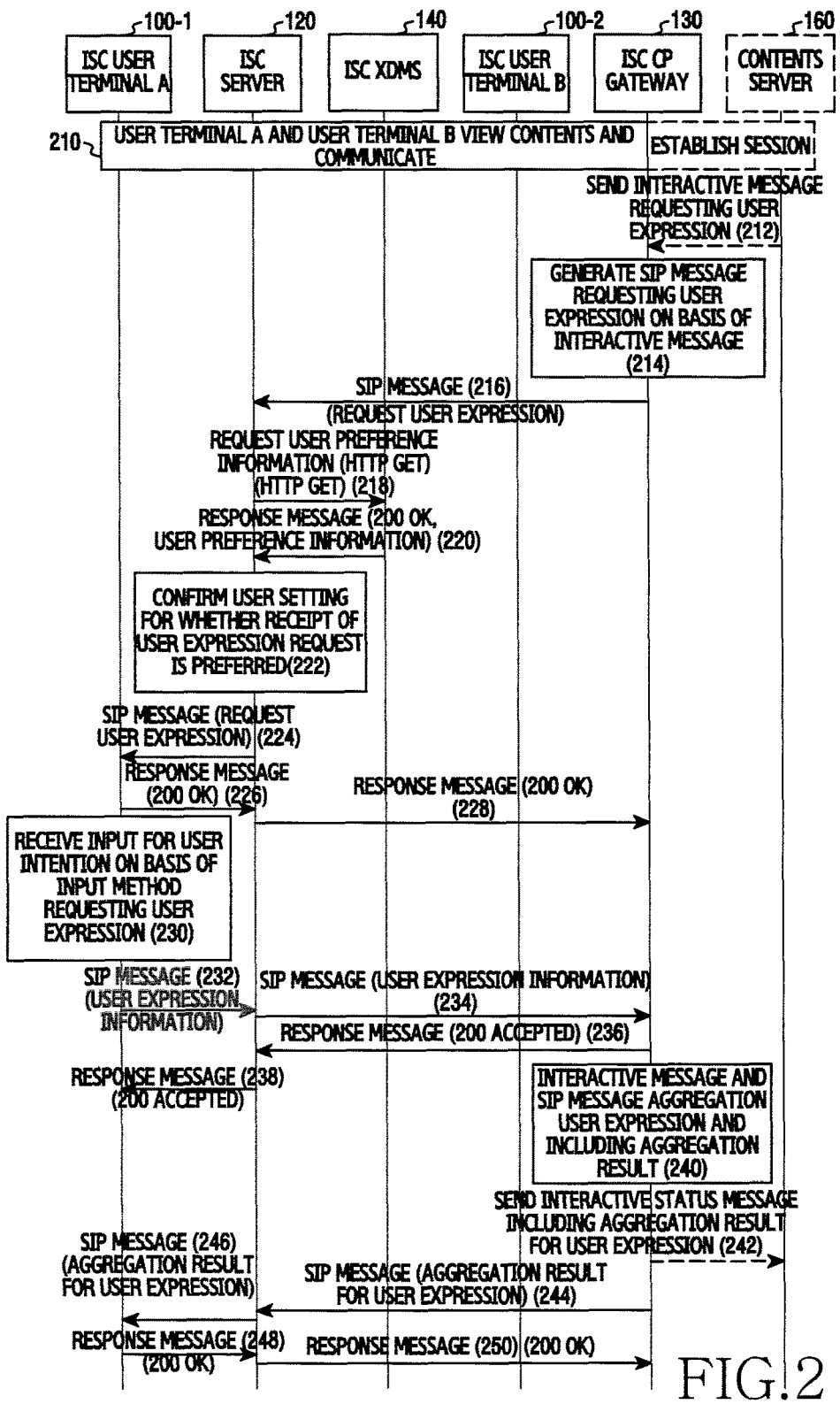
FIG. 2 is a view illustrating a signal flow for providing an immersive social centre service that manages the user expression for the content, according to the embodiment of the present disclosure.

FIG. 2 illustrates a signal flow for providing an immersive social centre service that manages the user expression for the content, according to the embodiment of the present disclosure. In the embodiment of the present disclosure, the ISC user terminal and the user terminal refer to a terminal device 100 that includes the ISC client 110. In the embodiment of the present disclosure, although the description will be made on the assumption that user expressions for the content are collected in the case where the ISC user terminal A (100-1) and the ISC user terminal B (100-2) view the corresponding content together and communicate, for the convenience of explanation, the following embodiments may be applied in the same manner to the case where the user expressions for the content are collected when two or more ISC user terminals view the corresponding content together. In addition, in the following embodiments, although the description will be made on the assumption that a single ISC server 120 manages the ISC user terminal A (100-1) and the ISC user terminal B (100-2) for the convenience of explanation, the ISC user terminal A (100-1) and the ISC user terminal B (100-2) may be managed by different ISC servers, respectively.

Referring to FIG. 2, the ISC user terminal A (100-1) and the ISC user terminal B (100-2) perform communication while viewing the content together, which is provided from the content server 160 through the ISC server 120 and the ISC CP gateway 130, in step 210. At this time, a session for transmitting and receiving content is established between the ISC CP gateway 130 and the content server 160.

In order to collect expressions of the users who are viewing the content according to a request of the provider or user, the content server 160 generates an interactive message that requests the user expression, and transmits the generated interactive message to the ISC CP gateway 130 in step 212. The interactive message requesting the user expression may contain information, such as the recipient address, the sender address, the object for the expression, a participating method for the expression, the deadline for the expression, a request for user's confirmation on the reception, or the like. Here, the recipient address may mean the address of the user {e.g., the address of the ISC user terminal A (100-1) or the address of the ISC user terminal B (100-2)} who is viewing the content, and the sender address may mean the address of the equipment that is to collect the user expression. In addition, the object for the expression may refer to an object for which the user gives an expression, and may be a person or an item. For example, if the content provider wishes to collect the user expressions for a specific person in the content that the ISC user terminals are viewing, the content provider may configure the specific person to be the object for the expression. In addition, the deadline for the expression may mean the deadline for collecting the user expressions from the user terminals, and the participating method for the expression may mean an expression method of the user, which is configured by the service provider, such as a vote, Voice of Customer (VoC), or feedback. In addition, the request information for a user's confirmation of reception refers to information that makes a request to the user terminal for informing of whether or not the user has confirmed the user expression request message after the reception of the user expression request message.

The ISC CP gateway 130 generates an SIP message that requests the user expression based on the interactive message that is received from the content server 160 in step 214. For example, the ISC CP gateway 130 converts the interactive message requesting the user expression into an SIP message, which can be delivered in the ISC system. According to the embodiment of the present disclosure, the body of the SIP message requesting the user expression may include information that states that the corresponding message is a message requesting the user expression, and may include sub elements. The sub elements may contain: a user expression method; the description related to the user expression request; selectable items according to the user expression method or selectable grades for each item; information on the participating method for the user expression; and deadline information for the expression. Here, the selectable items according to the user expression method or the item information may contain identification information and/or URL (Uniform Resource Locator) information, and the information on the participating method for the user expression may contain information on equipment (e.g., a telephone number or a URL) that delivers the user expression information. Additionally, the SIP messages described below may contain recipient information and sender information.

For example, the schema of the body of the SIP message requesting the user expression may be configured as shown in Table 1 below.

TABLE 1

```
<user-expression id="abab1212">
<input>vote</input>
<description>Vote the top singer NOW!</description>
<items>
<item id="aaaa" url="www.example.com/topsigner/11/michael">michael</item>
<item id="bbbb" url="www.example.com/topsigner/11/tom">tom</item>
<item id="cccc" url="www.example.com/topsigner/11/luke">luke</item>
</items>
<participation>
<comm-addr>010-9530-5100</comm-addr>
<comm-addr>sip:top.signer@example.com</comm-addr>
</participation>
<expired-time>2013-10-17T20:00:00</expired-time>
</user-expression>
```

In Table 1, <user-expression id> refers to an identifier that indicates that the corresponding message is the user expression request message. In addition, <input> means a user expression method, and here, for example, a vote is configured to be the user expression method. In addition, <description> refers to the description related to the user expression request, and here, for example, it shows that the corresponding user expression request is intended to select a top singer. In addition, <items> refers to selectable items according to the user expression method or selectable grades for each item, and contains, as the sub information, <id> and <url> for the item. Here, for example, <items> contains id and url for three selectable singers "michael," "tom," and "luke." In addition, <participation> refers to information on the participating method for the user expression, and here, for example, contains a telephone number and a URL. In addition, <expired-time> is information representing the deadline for the user expression, and here, it shows that the user expression information will be collected by 20:00 on Oct. 17, 2013. Table 1 described above relates to the case where the user expression method is a vote, and in the case where the user expression method is VoC or feedback, Table 1 described above may be changed to a form suitable for VoC or feedback. For example, the VoC may be configured to select grades for one or more items (e.g., satisfaction or evaluation scores), and the feedback may be configured such that a user's opinion about one or more items is input in the form of text data.

The ISC CP gateway 130 transmits the SIP message requesting the user expression to the ISC server 120 in step 216.

When the SIP message requesting the user expression is received from the ISC CP gateway 130, the ISC server 120 transmits, to the ISC XDMS 140, a message that requests user preference information (e.g., HTTP GET) in step 218, and receives a response message that includes the user preference information in step 220 (e.g., 200 OK). For example, in order to identify whether or not the ISC user terminal A (100-1) and the ISC user terminal B (100-2), which are viewing the content together, prefer to receive the user expression request, the ISC server 120 may make a request to the ISC XDMS 140 for transmitting a preference document, which is pre-configured with respect to the ISC user terminal A (100-1) and the ISC user terminal B (100-2), and may receive the preference document from the ISC XDMS 140. Here, the preference document may contain information indicating whether or not to prefer to receive the user expression request message, and this information may be pre-configured by a request of the corresponding user terminal.

For example, the preference document of the user terminal A (100-1) may be configured as shown in Table 2 below.

TABLE 2

```
<isc-upp xmlns="urn:oma:xml:isc:user-prefs">
<isc-upp-set>
<profile id="1234">
<display-name>MyISCPreferences</display-name>
<isc-up-01>true</isc-up-01>
<isc-up-02>true</isc-up-02>
    ...
<receive-user-expression>true</receive-user-expression>
    ...
</profile>
</isc-upp-set>
<isc-upp>
```

In Table 2, <receive-user-expression> is information indicating whether or not to prefer to receive the user expression request message. For example, if <receive-user-expression> is configured to be "true," it may show that the corresponding user prefers to receive the user expression request message from the content server 160, and if <receive-user-expression> is configured to be "false," it may show that the corresponding user does not prefer to receive the user expression request message from the content server 160. Hereinafter, for the convenience of explanation, the description will be made on the assumption that <receive-user-expression> is configured to be "true" in the preference document of the ISC user terminal A (100-1) and <receive-user-expression> is configured to be "false" in the preference document of the ISC user terminal B (100-2).

The ISC server 120, in step 222, identifies the user settings for whether or not to prefer to receive the user expression request in the ISC user terminal A (100-1) and the ISC user terminal B (100-2) through the response message including the user preference information. For example, the ISC server 120 identifies that the ISC user terminal A (100-1) prefers to receive the user expression request message, whereas the ISC user terminal B (100-2) does not prefer to receive the user expression request message. Thereafter, the ISC server 120 delivers the SIP message requesting the user expression to the ISC user terminal A (100-1) in step 224.

The ISC user terminal A (100-1) transmits, to the ISC server 120, a response message (e.g., 200 OK) to the SIP message requesting the user expression in step 226, and the ISC server 120 delivers the corresponding response message to the ISC CP gateway 130 in step 228.

The ISC user terminal A (100-1) creates an interface for receiving an input of the user expression based on the input method included in the user expression request message, and displays the same on the screen in order to thereby receive an input that expresses the user intention from the user in step 230. For example, if the user expression request message is a message that makes a request for a vote to select a top singer from among "michael," "tom," and "luke", as shown in Table 1 above, an input to vote a specific singer among the three singers may be received.

The ISC user terminal A (100-1) generates an SIP message that contains the input user expression information, and transmits the generated SIP message to the ISC server 120 in step 232. Here, the SIP message including the user expression information may contain the user's selection item according to the user expression method or item information thereof, or may contain text data information. In addition, the SIP message including the user expression information may contain information indicating whether or not to receive the result of the user expression collection.

For example, the schema of the body of the SIP message including the user expression information may be configured as shown in Table 3 below.

TABLE 3

```
<user-expression id="cdcd3434">
<input>vote</input>
<note>I love michael</note>
<items>
<item id="aaaa">michael</item>
</items>
<status-report>true</status-report>
</user-expression>
```

In Table 3, <user-expression id> shows that the corresponding message contains information indicating the user expression information, and <input> represents the user expression method. Here, the example shows that the user expression method is a vote. In addition, <note> refers to the description of the user expression, which may be directly input by the user. In addition, <items> refers to the user's selection according to the user expression method, and here, the example shows that the singer "michael" of the id "aaaa" has been selected by the user. <items> may contain id and/or url information according to the user expression method. In addition, <status-report> may indicate whether or not the user wishes to receive the result of the user expression collection. For example, if <status-report> is configured to be true, it may indicate that the user wishes to receive the result of the user expression collection, and if <status-report> is configured to be false, it may indicate that the user does not wish to receive the result of the user expression collection. Table 3 described above relates to the case where the user expression method is a vote, and in the case where the user expression method is VoC or feedback, Table 3, which is described above, may be changed to a form that is suitable for VoC or feedback. For example, when the user expression method is VoC, grade information representing satisfaction or evaluation scores for one or more items may be contained, and when the user expression method is feedback, a user's opinion about one or more items may be contained in the form of text data.

When the SIP message including the user expression information is received from the ISC user terminal A (100-1), the ISC server 120 delivers the SIP message including the user expression information to the ISC CP gateway 130 in step 234. The ISC CP gateway 130 transmits, to the ISC server 120, a response message (e.g., 200 Accepted) to the SIP message in step 236, and the ISC server 120 delivers, to the ISC user terminal A (100-1), the response message received from the ISC CP gateway 130 in step 238.

The ISC CP gateway 130, in step 240, analyzes the SIP message received from the ISC server 120 in order to thereby aggregate the user expression information, and generates an interactive message and an SIP message including the aggregation result of the user expression. For example, the ISC CP gateway 130 may receive the SIP messages including user expression information from one or more ISC servers by the deadline for the expression, and if the deadline for the expression expires, may analyze the SIP messages, which are received within the deadline for the expression, in order to thereby aggregate the user expression information.

The ISC CP gateway 130 transmits, to the content server 160, an interactive status message including the aggregation result of the user expressions in step 242, and transmits, to ISC server 120, an SIP message including the aggregation result of the user expressions in step 244. This is intended to transmit the result of the user expression collection to the users corresponding to the SIP message including the user expression information, which contains information stating that the user wishes to receive the result of the user expression collection. Therefore, the ISC CP gateway 130 may transmit the SIP message including the aggregation result of the user expressions to the ISC server that is associated with the user terminals that wish to receive the result of the user expression collection. Here, the SIP message including the aggregation result of the user expressions may contain the user expression method, the description related to the user expression, or status information on the user expression. Here, the state information on the user expression may contain information, such as the number of participants, the ids and/or urls for selectable items according to the user expression, the number of votes (or voters) for each selectable item, the number of selections for each selectable grade of the item, or the time of aggregating the user expressions.

For example, the schema of the body of the SIP message including the aggregation result of the user expressions may be configured as shown in Table 4 below.

TABLE 4

```
<user-expression-report id="abab1212">
<input>vote</input>
<description>Status of the Vote for the top singer NOW!</description>
<status>
<participation-num>14763</participation-num>
<items>
<item id="aaaa" url="www.example.com/topsigner/11/michael"
```

TABLE 4-continued

```
>michael</item>
<count>10</count>
<item id="bbbb" url="www.example.com/topsigner/11/tom"
>tom</item>
<count>9530</count>
<item id="cccc" url="www.example.com/topsigner/11/luke"
>luke</item>
<count>5223</count>
</items>
<counted-time>2013-10-17T19:45:00</counted-time>
</status>
</user-expression>
```

In Table 4, <user-expression-report id> shows that the corresponding message includes the aggregation result of the user expressions, and <input> represents the user expression method. Here, the example shows that the user expression method is a vote. In addition, <description> refers to the description related to the user expression, and here, for example, it shows that the corresponding user expression relates to the selection of a top singer. In addition, <items> means selectable items according to the user expression method or selectable grade information for each item, and contains, as sub information, <id>, <url>, and <count>. Here, for example, <items> contains <id>, <url>, and the number of votes for three singers "michael," "tom," and "luke." In addition, <counted-time> denotes the time for aggregating the user expressions and yielding the aggregation result. Table 4 described above relates to the case where the user expression method is a vote, and in the case where the user expression method is VoC or feedback, Table 4 described above may be changed to a form that is suitable for VoC or feedback. For example, when the user expression method is VoC, a statistic for grades for each item, which represent satisfaction or evaluation scores for one or more items, may be contained, and when the user expression method is feedback, opinions of a plurality of users about one or more items may be contained in the form of text data.

The ISC server 120 transmits, to the ISC user terminal A (100-1), the SIP message including the aggregation result of the user expressions in step 246. The ISC user terminal A (100-1) may display the aggregation result of the user expressions on the screen. The ISC user terminal A (100-1) transmits, to the ISC server 120, a response message (e.g., 200 OK) to the SIP message including the aggregation result of the user expressions in step 248, and the ISC server 120 transmits the corresponding response message to the ISC CP gateway 130 in step 250.

FIG. 2 described above has illustrated overall signal flows for providing the immersive social centre service that manages the user expressions in the ISC system, according to the embodiment of the present disclosure. Hereinafter, based on FIG. 2 described above, the operation procedure of the nodes included in the system and the function block configuration thereof will be described.

Figure 3:
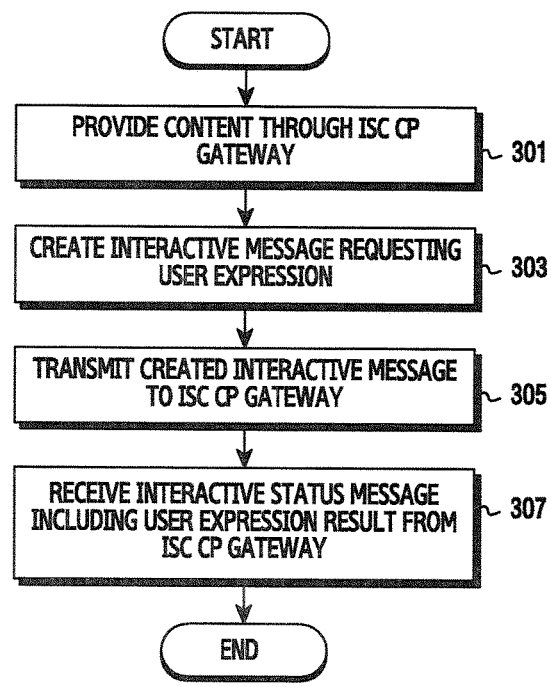
FIG. 3 is a flowchart illustrating the operation of a content server, according to the embodiment of the present disclosure.

FIG. 3 is a flowchart illustrating the operation of the content server, according to the embodiment of the present disclosure.

Referring to FIG. 3, the content server 160 provides specific content to the ISC user terminal through the ISC CP gateway 130 in step 301. For example, the content server 160 may provide content to the ISC user terminal A (100-1) and the ISC user terminal B (100-2).

Afterwards, the content server 160 generates an interactive message requesting the user expression in order to collect expressions of the users who are viewing the content according to a request by the service provider or the user in step 303. Here, the interactive message requesting the user expression, as described in FIG. 2, may contain information, such as the recipient address, the sender address, the object for the expression, a participating method for the expression, the deadline for the expression, a request for a user's confirmation on the reception, or the like. Thereafter, the content server 160 transmits the generated interactive message to the ISC CP gateway 130.

Thereafter, the content server 160 receives, from the ISC CP gateway 130, an interactive status message including the aggregation result of the user expressions in step 307.

Afterwards, the content server 160 terminates the procedure, according to the embodiment of the present disclosure.

Figure 4:
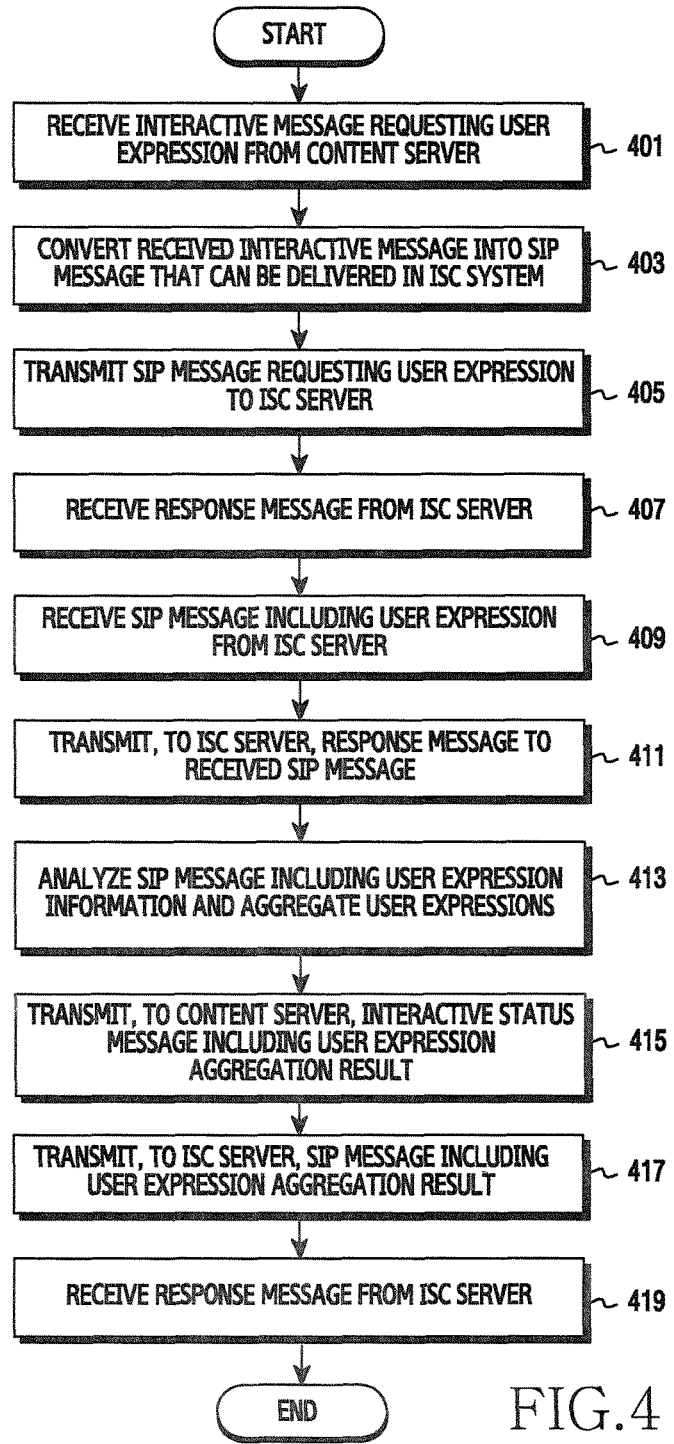
FIG. 4 is a flowchart illustrating the operation of an ISC CP gateway, according to the embodiment of the present disclosure.

FIG. 4 is a flowchart illustrating the operation of the ISC CP gateway, according to the embodiment of the present disclosure.

Referring to FIG. 4, the ISC CP gateway 130 receives, from the content server 160, an interactive message that requests the user expression in step 401, and converts the received interactive message into an SIP message, which can be delivered in the ISC system in step 403. For example, the ISC CP gateway 130 may generate the SIP message requesting the user expression, which has the same schema as shown in FIG. 1, based on the interactive message. Here, the ISC CP gateway 130 may identify the ISC user terminal to receive the user expression request message by using recipient information, which is contained in the interactive message, and may include address information of the corresponding ISC user terminal in the SIP message.

Thereafter, the ISC CP gateway 130 transmits the SIP message requesting the user expression to the ISC server 120 in step 405, and receives a response message from the ISC server 120 in step 407. Here, the ISC CP gateway 130 may transmit the SIP message requesting the user expression to the ISC server 120 that manages the ISC user terminal to receive the user expression request message.

Thereafter, the ISC CP gateway 130 receives the SIP message including user expression information from the ISC server 120 in step 409. Here, the SIP message including the user expression information may be configured with the same schema as shown in Table 3 above. Thereafter, the ISC CP gateway 130 sends, to the ISC server 120, a response message to the SIP message including the user intention in step 411.

Thereafter, the ISC CP gateway 130 analyzes the SIP messages including the user intention, and aggregates the user expressions in step 413. At this time, the ISC CP gateway 130 may receive the SIP messages including user expression information from one or more ISC servers by the deadline for the expression request by the content server, and if the deadline for the expression expires, may analyze the SIP messages, which are received within the deadline for the expression in order to thereby aggregate the user expression information.

Afterwards, the ISC CP gateway 130 generates an interactive status message including the aggregation result of the user expressions, and transmits the generated interactive status message to the content server 160 in step 415. In addition, the ISC CP gateway 130 generates an SIP message including the aggregation result of the user expression, and transmits the generated SIP message to the ISC server 120 in step 417. For example, the ISC CP gateway 130 may generate the SIP message, which has the schema as shown in Table 4 described above, and in order to transmit the SIP message including the aggregation result of the user expressions to the ISC terminals of the users who wished to receive the result of the user expressions through the SIP message including the user expression information, may transmit the generated SIP message to the ISC server 120.

Thereafter, the ISC CP gateway 130 receives a response message from the ISC server 120 in step 419.

Thereafter, the ISC CP gateway 130 terminates the operation procedure, according to the embodiment of the present disclosure.

Figure 5:
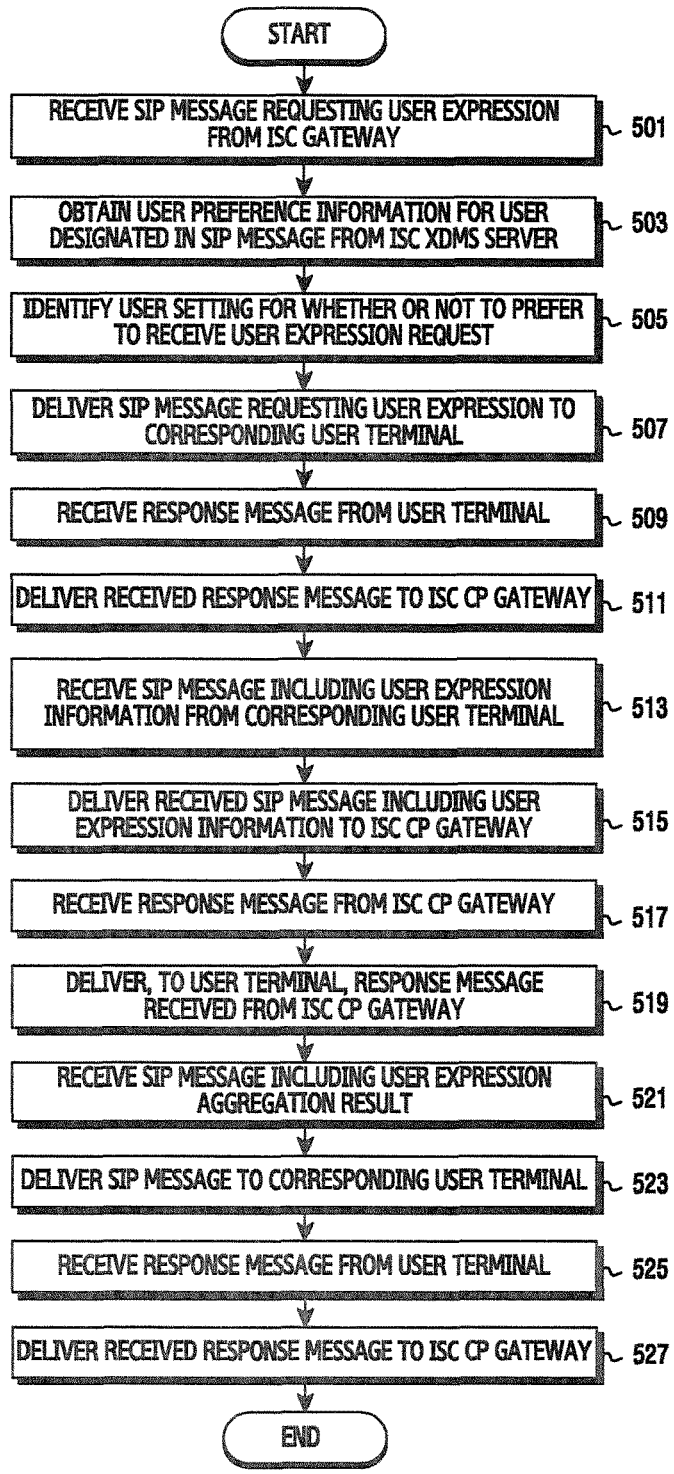
FIG. 5 is a flowchart illustrating the operation of an ISC server, according to the embodiment of the present disclosure.

FIG. 5 is a flowchart illustrating the operation of the ISC server, according to the embodiment of the present disclosure.

Referring to FIG. 5, the ISC server 120 receives an SIP message requesting the user expression from the ISC CP gateway 130 in step 501.

The ISC server 120 obtains, from the ISC XDMS 140, user preference information with respect to the user who is designated in the SIP message in step 503. For example, the ISC server 120 may: identify the recipient address information of the SIP message; determine a plurality of ISC user terminals to which the SIP message is to be transmitted; make a request to the ISC XDMS 140 for preference information of the corresponding ISC user terminals; and receive a preference document that contains the preference information of the corresponding ISC user terminals from the ISC XDMS 140. At this time, the preference document of the ISC user terminals may be configured as shown in Table 2. Thereafter, the ISC server 120 identifies the user's settings for whether or not to prefer to receive the user expression request based on the user preference information in step 505. Provided that the user preference document, for example, is configured as shown in Table 2, if <receive-user-expression> is configured to be "true" in the user preference document, the ISC server 120 may determine that the corresponding user prefers to receive the user expression request message from the content server 160, and if <receive-user-expression> is configured to be "false" in the user preference document, the ISC server 120 may determine that the corresponding user does not prefer to receive the user expression request message from the content server 160. Hereinafter, the description will be made on the assumption that <receive-user-expression> in the preference document of at least one ISC user terminal is configured to be "true" for the convenience of explanation.

The ISC server 120 transmits an SIP message requesting the user expression to the ISC user terminal in step 507. Of course, at this time, the ISC server 120 transmits the SIP message requesting the user expression to the ISC user terminal that prefers the reception of the user expression request message, and does not transmit the SIP message requesting the user expression to the ISC user terminal that does not prefer the reception of the user expression request message.

The ISC server 120 receives, from the ISC user terminal 100, a response message indicating that the ISC user terminal 100 has received the SIP message in step 509, and transmits the received response message to the ISC gateway 130 in step 511.

Thereafter, the ISC server 120 receives an SIP message including the user expression information from the corresponding user terminal in step 513, and transmits the SIP message including the user expression information to the ISC CP gateway 130 in step 515. At this time, the SIP message including the user expression information may be configured as shown in Table 3 described above.

The ISC server 120 receives a response message from the ISC CP gateway 130 in step 517, and transmits, to the ISC user terminal 100, the response message received from the ISC CP gateway 130 in step 519.

Thereafter, the ISC server 120 receives an SIP message including the aggregation result of the user expressions from the ISC CP gateway 130 in step 521. The aggregation result of the user expressions may be configured as shown in Table 4 described above. The ISC server 120 delivers, to the corresponding ISC user terminal, the SIP message including the aggregation result of the user expressions in step 523. For example, the ISC server 120 delivers the SIP message including the aggregation result of the user expressions to the user terminal, which has expressed that the user prefers to receive the user expression collection result through the SIP message including the user expression information.

Thereafter, the ISC server 120 receives a response message (e.g., 200 OK) from the ISC user terminal 100 in step 525, and transfers the received response message to the ISC CP gateway 130 in step 527.

Thereafter, the ISC server 120 terminates the operation procedure, according to the embodiment of the present disclosure.

Figure 6:
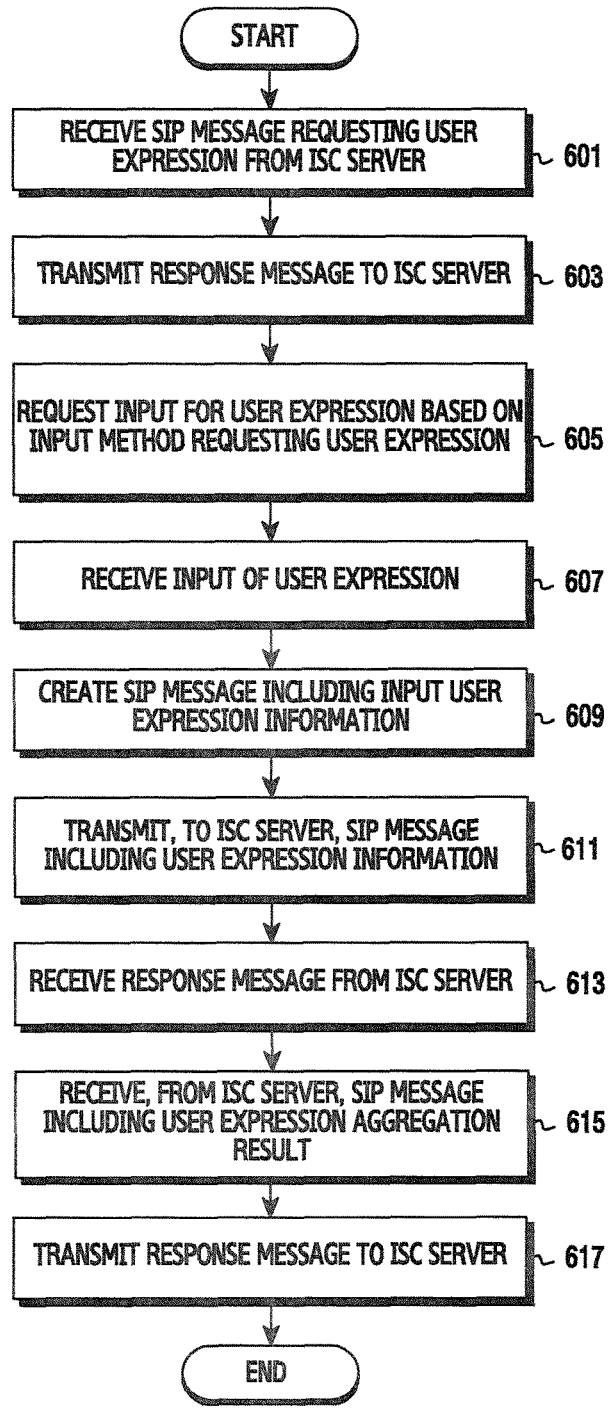
FIG. 6 is a flowchart illustrating the operation of an ISC user terminal, according to the embodiment of the present disclosure.

FIG. 6 is a flowchart illustrating the operation of the ISC user terminal, according to the embodiment of the present disclosure.

Referring to FIG. 6, the ISC user terminal 100 receives an SIP message requesting the user expression from the ISC server 120 in step 601, and transmits a response message to the ISC server 120 in step 603.

Thereafter, the ISC user terminal 100 makes a request for an input of the user expression based on the input method of requesting the user expression in step 605, and receives the input of the user expression in step 607. That is, the ISC user terminal 100 may generate an interface for receiving the input of the user expression according to the expression input method, and may display the same on the screen in order to thereby receive the input for expressing the user intention from the user. For example, if the SIP message requesting the user expression is a message that makes a request for a vote to select a top singer from among "michael," "tom," and "luke", as shown in Table 1 described above, the ISC user terminal 100 may create an interface to vote for one of the three singers in order to thereby receive, from the user, an input to vote for a specific singer among the three singers. As another example, if the SIP message requesting the user expression is a message that makes a request for the feedback type of evaluation for the content that is being viewed, the ISC user terminal 100 may create an interface to input a review on the content in the form of text data, and may receive the text data of the review of the content.

Thereafter, the ISC user terminal 100 creates an SIP message that contains the input user expression information in step 609, and transmits the SIP message containing the expression information to the ISC server 120 in step 611. Thereafter, the ISC user terminal 100 receives a response message from the ISC server 120 in step 613.

The ISC user terminal 100 receives, from the ISC server 100, the SIP message including the user intention aggregation result in step 615. Of course, the ISC user terminal 100 may receive the SIP message including the aggregation result for the user intention when the information or menu is input or selected by the user, which indicates that the user prefers to receive the result of the user expression.

Thereafter, the ISC user terminal 100 transmits, to the ISC server, a response message indicating that the SIP message including the user intention aggregation result has been received in step 617.

Thereafter, the ISC user terminal 100 terminates the operation procedure, according to the embodiment of the present disclosure.

A method of a server for providing the user expression service, according to various embodiments of the present disclosure, may include: receiving, from a gateway connected with a content server, a message that makes a request to a terminal of a user who is viewing content for a user expression; determining whether or not the user terminal prefers to receive the user expression request message; delivering, to the user terminal, the message requesting the user expression if the user terminal prefers to receive the user expression request message; and receiving, from the user terminal, a message that contains user expression information in order to thereby deliver the same to the gateway.

In various embodiments of the present disclosure, the determining of whether or not the user terminal prefers to receive the user expression request message may include: making a request to an XML document management server for preference information of the terminal of the user who is viewing the content; receiving the preference information of the user terminal from XML document management server; and determining whether or not the user terminal prefers to receive the user expression request message based on the received preference information, and the preference information may be pre-configured by the user terminal.

In various embodiments of the present disclosure, the method may further include: receiving a result message of the user expression information collection from the gateway; and transmitting the received result message of the user expression information collection to the user terminal.

In various embodiments of the present disclosure, the message requesting the user expression of the user terminal may contain at least one of: identification information indicating the message requesting the user expression; a user expression method; the description related to the user expression request; selectable items according to the user expression method or selectable grades for each item; information on the participating method for the user expression; or deadline information for the expression.

A method of a terminal for providing a user expression service, according to various embodiments of the present disclosure, may include: configuring whether or not to prefer to receive a user expression request message for content; receiving, from a server, a user expression request message for the content that is being viewed if the reception of the user expression request message is preferred; receiving an input of user expression information from a user; and transmitting, to the server, a message including the user expression information.

In various embodiments of the present disclosure, the method may further include creating an interface for receiving an input of the user expression based on the user expression request message and displaying the same on the screen, wherein the interface may be created based on the user expression method, and the expression method may include at least one of: selecting an item; selecting a grade for an item; or inputting text.

In various embodiments of the present disclosure, the message including the user expression information may contain at least one of: selectable items according to the user expression method; selectable grades for each item; text data information; or information indicating whether or not the reception of the user expression collection result is preferred.

In various embodiments of the present disclosure, if the message including the user expression information is configured such that the reception of the user expression collection result is preferred, the method may further include receiving a user expression collection result message from the server.

A method of a gateway for providing a user expression service, according to various embodiments of the present disclosure, may include: receiving, from a content server, a message that makes a request to a terminal of a user who is viewing specific content for a user expression; converting the message received from the content server into a message form, which can be delivered in a system; and transmitting the converted user expression request message to a server that is associated with the user terminal.

In various embodiments of the present disclosure, the method may further include: receiving, from the server, a message including user expression information; aggregating the user expression information based on the user expression information received from the server; and transmitting the user expression aggregation result to the content server.

In various embodiments of the present disclosure, the method may further include: identifying a user terminal that is configured to prefer to receive the user expression collection result in the message including the user expression information; and transmitting, to the corresponding server, a message for transmitting the user expression aggregation result to the identified user terminal.

In various embodiments of the present disclosure, the message for transmitting the user expression aggregation result to the identified user terminal may contain at least one of: a user expression method; the description related to the user expression; the number of participants; information on selectable items according to the user expression; the number of votes for each selectable item; the number of selections for each selectable grade of the item; or the time when aggregating the user expression occurs.

A method of a content server for providing a user expression service, according to various embodiments of the present disclosure, may include: transmitting, to a gateway, a message that makes a request to a terminal of a user who is viewing content for a user expression; and receiving a collection result of user expression information from the gateway, wherein the message requesting the user expression may contain at least one of: the recipient address; the sender address; the object for the expression; a participating method for the expression; the deadline for the expression; or request information for user's confirmation on the reception.

Figure 7:
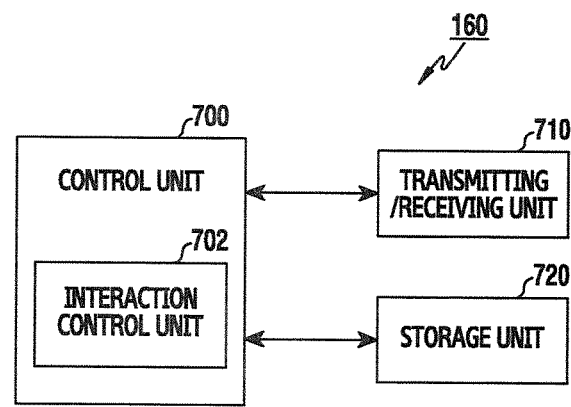
FIG. 7 is a functional block diagram of a content server, according to the embodiment of the present disclosure.

FIG. 7 is a functional block diagram of the content server, according to the embodiment of the present disclosure.

Referring to FIG. 7, the content server 160 may be configured to include a control unit 700, a transmitting/receiving unit 710, and a storage unit 720.

The control unit 700 sets a session with the ISC CP gateway 130 in order to thereby control and process a function for providing content to the ISC user terminals. Additionally, the control unit 700, according to the embodiment of the present disclosure, includes an interaction control unit 702 in order to thereby control and process a function for collecting the expression of the user who is viewing the content according to a request by the service provider or the user. That is, the interaction control unit 702 controls and processes the functions of: generating a message requesting the user expression; transmitting the same to the ISC CP gateway 130 through the transmitting/receiving unit 710; and receiving a message including the result of the user expressions from the ISC CP gateway 130. The interaction control unit 702 controls and processes a function of providing the result of the user expressions to the content provider or the user. Here, the interactive message requesting the user expression, as shown in FIG. 2 described above, may contain information, such as the recipient address, the sender address, the object for the expression, the participating method for the expression, the deadline for the expression, a request for user's confirmation on the reception, or the like.

The transmitting/receiving unit 710 performs a communication function with the ISC CP gateway 130 according to the control of the control unit 700. For example, the transmitting/receiving unit 710 controls and processes functions of: setting a session with the ISC CP gateway 130 in order to thereby transmit content; and transmitting and receiving the interactive message.

The storage unit 720 stores a variety of programs and data that is necessary for the operation of the content server 160. The storage unit 720 may store a variety of content, and may store a variety of information that is necessary for collecting the user expressions and information indicating the user expression result.

Figure 8:
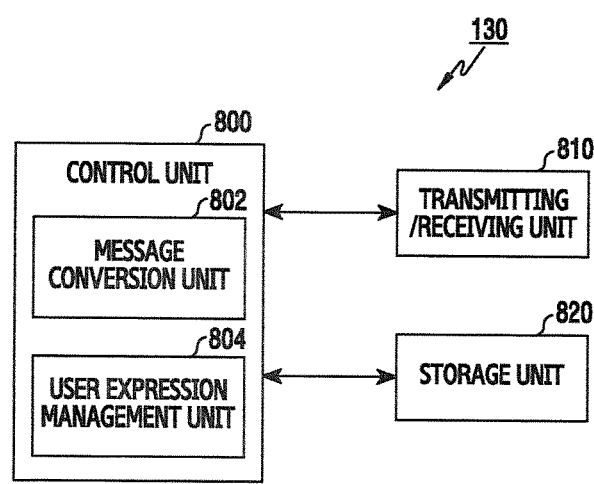
FIG. 8 is a functional block diagram of an ISC CP gateway, according to the embodiment of the present disclosure.

FIG. 8 is a functional block diagram of the ISC CP gateway, according to the embodiment of the present disclosure.

Referring to FIG. 8, the ISC CP gateway 130 may include a control unit 800, a transmitting/receiving unit 810, and a storage unit 820.

The control unit 800 communicates with the content server 160 in order to thereby control a function for real time or non-real time communication between the ISC users and the content provider. In addition, the control unit 800 may receive, from the content server 160, media content for the content-viewing or the continuous content-viewing of the ISC user terminal 100, and may provide the same to the ISC server 120. Additionally, the control unit 800 may include a message conversion unit 802 in order to thereby convert a message received from the content server 160 into an SIP message, which can be delivered in the ISC system. In addition, the control unit 800 includes a user expression management unit 804 in order to thereby control and process the functions of: receiving a user expression request message for specific content from the content server 160; and collecting and aggregating expression information of the users who are using the corresponding content in the ISC system.

In other words, the message conversion unit 802 may convert a user expression request interactive message received from the content server 160 into an SIP message, which includes the same schema as shown in Table. 1. In addition, the message conversion unit 802 controls and processes a function for converting the user expression received from the ISC server 120 into a message that is understandable in the content server 160.

In addition, when a user expression request message for specific content is received from the content server 160, the user expression management unit 804 controls and processes the functions of: making a request to the message conversion unit 802 for converting the corresponding message into an SIP message form; identifying recipient information in the user expression request message received from the content server 160; and transmitting the converted SIP message to the ISC server 120, which is associated with the user terminal corresponding to the recipient information. In addition, the user expression management unit 804 controls and processes the functions of: receiving the SIP message including the user expression information from the ISC server 120; aggregating the received user expression information; and transmitting the aggregation result to the content server 160 and the user terminal 100, which prefers to receive the user expression result. At this time, the user expression management unit 804 may receive the SIP messages including the user expression information before the deadline for the user expression related to the corresponding content expires, and when the expression deadline expires, may not process the reception of the SIP message related to the corresponding content.

The transmitting/receiving unit 810 performs a communication function with the content server 160 and the ISC server 120 according to the control of the control unit 800. For example, the transmitting/receiving unit 810 control and processes functions of: setting a session with the content server 160 in order to thereby receive content; and transmitting and receiving the interactive message. In addition, the transmitting/receiving unit 810 controls and processes functions of: providing content to the ISC server 120; and transmitting and receiving the SIP message related to the user expression.

The storage unit 820 stores a variety of programs and data that is necessary for the operation of the ISC CP gateway 130. The storage unit 820 may store the interactive message for specific content received from the content server 160, and may store the SIP message including the user expression information for specific content and user expression result information.

Figure 9:
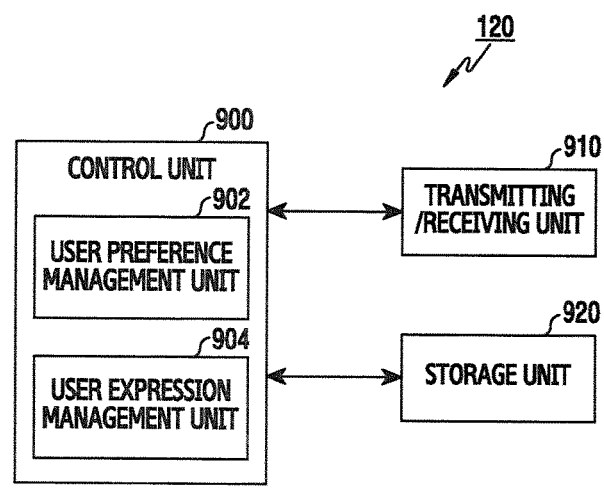
FIG. 9 is a functional block diagram of an ISC server, according to the embodiment of the present disclosure.

FIG. 9 is a functional block diagram of the ISC server, according to the embodiment of the present disclosure.

Referring to FIG. 9, the ISC server 120 may be configured to include a control unit 900, a transmitting/receiving unit 910, and a storage unit 920.

The control unit 900 controls and processes the functions of: registration/mutual authentication of the ISC user terminal 100; generation of a content guide; association and transmission of primary content and associated content; storage and management of content; management of multi-equipment; management of a content viewing session and a communication session; distribution of content; or conveyance of social interaction and an immersive experience. Additionally, according to the embodiment of the present disclosure, the control unit 900 may include a user preference management unit 902 and user expression management unit 904 in order to thereby process functions related to a user expression request for the content and a response thereof.

The user preference management unit 902 performs the control and process for obtaining user preference information of the ISC user terminal 100 according to the control of the user expression management unit 904, which has detected the reception of an SIP message requesting the user expression from the ISC CP gateway 130. That is, the user preference management unit 902 controls and processes the functions of: making a request to the ISC XDMS 140 for the preference information of the ISC user terminal; and receiving, from the ISC XDMS 140, a preference document containing the preference information of the corresponding ISC user terminals, and identifies the user settings for whether or not the reception of the user expression request is preferred based on the received user preference document. The user preference management unit 902 may provide the user expression management unit 904 with the user setting information, which has been identified with respect to whether or not the reception of the user expression request is preferred.

The user expression management unit 904 detects the reception of the SIP message requesting the user expression from the ISC CP gateway 130, and makes a request to the user preference management unit 902 for the preference information of the ISC user terminals 100, which are to receive the user expression request message. The user expression management unit 904 controls and processes the functions of: receiving, from the user preference management unit 902, information indicating whether or not each ISC user terminal 100 prefers to receive the user expression request; and transmitting the message requesting the user expression to the ISC user terminal 100, which prefers to receive the user expression request. In addition, the user expression management unit 904 controls and processes the functions of: transmitting, to the ISC CP gateway 130, the messages related to the user expression received from the ISC user terminal 100; and transmitting, to the ISC user terminals 100, the messages related to the user expression received from the ISC CP gateway 130.

The transmitting/receiving unit 910 performs a communication function with the ISC CP gateway 130 and the ISC user terminal 100 according to the control of the control unit 900. For example, the transmitting/receiving unit 910 receives content from the ISC CP gateway 130 in order to thereby provide the same to the ISC user terminal 100. In addition, the transmitting/receiving unit 910 delivers, to the ISC CP gateway 130, the messages related to the user expression received from the ISC user terminal 100, and delivers, to the ISC user terminal 100, the messages related to the user expression received from the ISC CP gateway 130 according to the control of the control unit 900.

The storage unit 920 stores a variety of programs and data necessary for the operation of the ISC server 120. The storage unit 920 may store the SIP message including the user expression information for specific content and the user expression result information.

Figure 10:
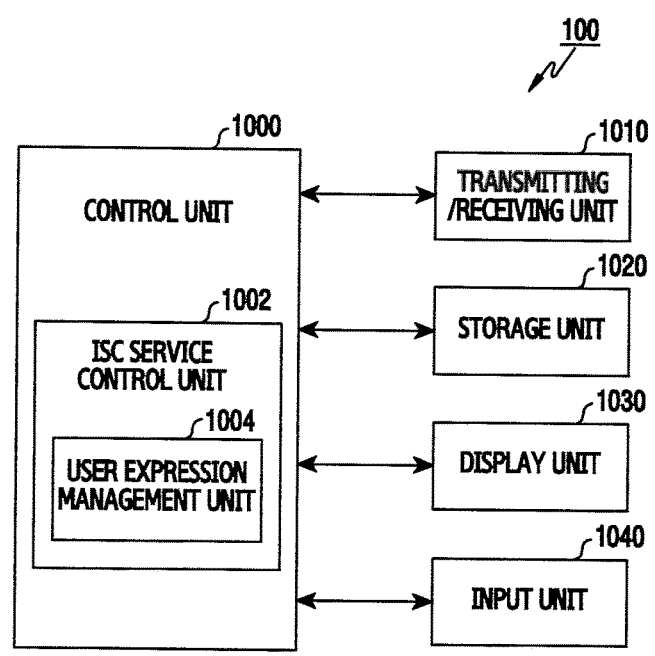
FIG. 10 is functional block diagram of an ISC user terminal, according to the embodiment of the present disclosure.

FIG. 10 is functional block diagram of the ISC user terminal, according to the embodiment of the present disclosure.

Referring to FIG. 10, the ISC user terminal 100 may be configured to include a control unit 1000, a transmitting/receiving unit 1010, a storage unit 1020, a display unit 1030, and an input unit 1040.

The control unit 1000 performs the control and process for the overall operations of the ISC user terminal 100. In particular, the control unit 1000 may include an ISC service control unit 1002, and may control and process the functions of performing: the registration of an ISC user; the communication between ISC users (e.g., transmission and reception of chat messages/files); functions related to a group of users who view the content together (for example, add/delete viewing participants); the synchronization of content-viewing; checking the performance of the user equipment; the management of content-viewing information; and the reception/management of media content. Additionally, according to the embodiment of the present disclosure, the ISC service control unit 1002 may include the user expression management unit 1004 in order to thereby control and process the functions of: receiving, from the ISC server 120, a request for the user expression for the content that is being viewed; and receiving an input of information that represents an expression for the content from the user. In addition, the user expression management unit 1004 may perform functions of: providing the ISC server 120 with the user expression information received from the user; receiving, from the ISC server 120, the expression result of other users who are viewing the content together in the group; and providing the same to the user.

The transmitting/receiving unit 1010 performs a communication function with the ISC server 120 under the control of the control unit 1000. For example, the transmitting/receiving unit 1010 controls and processes a function for receiving content from the ISC server 120. In addition, the transmitting/receiving unit 1010 receives, from the ISC server 120, the SIP message requesting the user expression in order to thereby provide the same to the control unit 1000, and transmits, to ISC server 120, the SIP message, which is provided from the control unit 1000.

The storage unit 1020 stores a variety of programs and data necessary for the operation of the ISC user terminal 100. The storage unit 1020 stores data that is generated during the execution of a function corresponding to a program operated by the control unit 1000.

The display unit 1030 includes one or more software components that provide a user interface by using graphics between the user and the ISC user terminal 100. The display unit 1030 creates an interface for receiving an input of the user expression, and displays the same on the screen.

The input unit 1040 may be configured to include at least one of a touch sensor, numeral keys, character keys, or function keys. If the input unit 1040 includes a touch sensor, it is possible to detect a touch (or contact) through the touch sensor (not shown) in order to thereby transmit the detected touch input to the control unit 1000. If the input unit 1040 includes numeric keys and/or character keys, data representing a key input by the user is provided to the control unit 1000. For example, the input section 1040 provides an input indicating the user expression to the control unit 1000.

An apparatus of a server for providing a user expression service, according to various embodiments of the present disclosure, may include: a transmitting/receiving unit configured to communicate with a gateway connected with a content server and with a user terminal; and a control unit configured to control the functions of receiving, from the gateway, a message that makes a request to a terminal of a user who is viewing content for a user expression, determining whether or not the user terminal prefers to receive the user expression request message, delivering, to the user terminal, the message requesting the user expression if the user terminal prefers to receive the user expression request message, and receiving, from the user terminal, a message including user expression information in order to thereby deliver the same to the gateway.

In various embodiments of the present disclosure, the control unit may: make a request to an XML, document management server for preference information of the terminal of the user who is viewing the content; control a function for receiving the preference information of the user terminal from XML document management server; and determine whether or not the user terminal prefers to receive the user expression request message based on the received preference information, and the preference information may be pre-configured by the user terminal.

In various embodiments of the present disclosure, the control unit may control functions of: receiving a result message of the user expression information collection from the gateway; and transmitting the received result message of the user expression information collection to the user terminal.

In various embodiments of the present disclosure, the message requesting the user expression of the user terminal may contain at least one of: identification message indicating the message requesting the user expression; a user expression method; the description related to the user expression request; selectable items according to the user expression method or selectable grades for each item; information on the participating method for the user expression; or deadline information for the expression.

An apparatus of a terminal for providing a user expression service, according to various embodiments of the present disclosure, may include: a transmitting/receiving unit configured to communicate with a server; and a control unit configured to control the functions of configuring whether or not to prefer to receive a user expression request message for content, receiving, from the server, a user expression request message for the content that is being viewed if the reception of the user expression request message is preferred, receiving an input of user expression information from a user, and transmitting, to the server, a message including the user expression information.

In various embodiments of the present disclosure, the apparatus of the terminal may further include a display unit configured to display an interface for receiving an input of the user expression based on the user expression request message according to the control of the control unit.

In various embodiments of the present disclosure, the interface may be created based on the user expression method, and the expression method may include at least one of: selecting an item; selecting a grade for an item; or inputting text.

In various embodiments of the present disclosure, the message including the user expression information may contain at least one of: selectable items according to the user expression method; selectable grades for each item; text data information; or information indicating whether or not the reception of the user expression collection result is preferred.

In various embodiments of the present disclosure, if the message including the user expression information is configured such that the reception of the user expression collection result is preferred, the control unit may control a function for receiving a user expression collection result message from the server.

An apparatus of a gateway for providing a user expression service, according to various embodiments of the present disclosure, may include: a transmitting/receiving unit configured to communicate with a content server and a server that is associated with a user terminal; and a control unit configured to control functions of receiving, from the content server, a message that makes a request to a terminal of a user who is viewing specific content for a user expression, converting the message received from the content server into a message form that can be delivered in a system, and transmitting the converted user expression request message to the server associated with the user terminal.

In various embodiments of the present disclosure, the control unit may control functions of: receiving, from the server, a message including user expression information; aggregating the user expression information based on the user expression information received from the server; and transmitting the user expression aggregation result to the content server.

In various embodiments of the present disclosure, the control unit may control functions of: identifying a user terminal that is configured to prefer to receive the user expression collection result in the message including the user expression information; and transmitting, to the corresponding server, a message for transmitting the user expression aggregation result to the identified user terminal.

In various embodiments of the present disclosure, the message for transmitting the user expression aggregation result to the identified user terminal may contain at least one of: a user expression method; the description related to the user expression; the number of participants; information on selectable items according to the user expression; the number of votes for each selectable item; the number of selections for each selectable grade of the item; or the time of aggregating the user expression.

An apparatus of a content server for providing a user expression service, according to various embodiments of the present disclosure, may include: a transmitting/receiving unit configured to communicate with a gateway; and a control unit configured to control the functions of transmitting, to a gateway, a message that makes a request to a terminal of a user who is viewing content for a user expression, and receiving a user expression information collection result from the gateway, and the message requesting the user expression may contain at least one of: the recipient address; the sender address; the object for the expression; a participating method for the expression; the deadline for the expression; or request information for a user's confirmation on the reception.

Although the present disclosure has been described by the restricted embodiments and the drawings as described above, the present disclosure is not limited to the aforementioned embodiments and various modifications and alterations can be made from the descriptions by those skilled in the art to which the present disclosure pertains.

Operations according to an embodiment of the present disclosure may be implemented by a single controller. In this case, a program instruction for performing an operation implemented by various computers may be recorded in a computer-readable medium. The computer readable medium may include a program command, a data file, a data structure, and the like independently or in combination. The program command may be things specially designed and configured for the present disclosure, or things that are well known to and can be used by those skilled in the related art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. When some or all of base stations or relays described in the present disclosure are implemented by a computer program, a computer-readable recording medium which has stored the computer program is also included in the present disclosure. Therefore, the scope of the present disclosure should not be defined as being limited to the embodiments, but should be defined by the appended claims and equivalents thereof.

What is claimed is:

1. A method for providing a user interaction service in a communication system using a server, the method comprising:
    receiving, from a gateway, a request message for a user expression of a terminal;
    identifying a preference of the terminal based on a user preference document associated with the terminal, wherein the preference of the terminal indicates whether the terminal prefers to receive the request message for the user expression, and wherein the user preference document is obtained from an XML document management server (XDMS);
    transmitting, to the terminal, the request message for the user expression in response to identifying that the terminal prefers to receive the request message for the user expression;
    receiving, from the terminal, a first response message including information about the user expression; and
    transmitting the first response message to the gateway,
    wherein the request message for the user expression includes at least one of a description about the user expression, a way for a participation of the user expression, or an expiration time of the user expression.

2. The method of claim 1, further comprising:
    receiving a second response message including a status of at least one user expression from the gateway; and
    transmitting the second response message to the terminal,
    wherein the status of at least one user expression is generated by the gateway which aggregates the at least one user expression received from at least one terminal.

3. The method of claim 1, wherein the request message for the user expression further includes at least one of: a name of a user interaction, an identifier of the user interaction, at least one item for the user interaction, identifier of at least one item, an uniform resource locator (URL) of at least one item, or a communication address of the user expression.

4. The method of claim 2, wherein the second response message includes at least one of: a name for a report of the user expression, an identifier for a report of the user expression, a description for a report of the user expression, a status for a report for the user expression, a number of participation of the user expression, at least one item for a report of the user expression, an identifier of the at least on item, an uniform resource locator (URL) of at least one item, a number of a user expression count, or a time of the user expression count.

5. The method of claim 1, wherein the information associated with the preference of the terminal includes an element regarding reception of the user expression.

6. The method of claim 5, wherein the transmitting, to the terminal, the request message for the user expression according to the preference of the terminal comprises:
    when the element regarding reception of the user expression is set to 'true', forwarding the request message to the terminal; and
    when the element regarding reception of the user expression is set to 'false', rejecting the request message.

7. A server for providing a user interaction service in a communication system, the server comprising:
    at least one transceiver configured to receive, from a gateway, a request message for a user expression of a terminal;
    at least one processor operatively coupled to the at least one transceiver, and configured to identify preference of the terminal based on a user preference document associated with the terminal,
    wherein the preference of the terminal indicates whether the terminal prefers to receive the request message for the user expression and wherein the user preference document is obtained from a XML document management server (XDMS),
    wherein the at least one transceiver is further configured to:
        transmit, to the terminal, the request message for the user expression according to the preference of the terminal, in response to identifying that the terminal prefers to receive the request message for the user expression, receive, from the terminal, a first response message including information about the user expression; and transmit the first response message to the gateway, wherein the request message for the user expression includes at least one of a description about the user expression, a way for a participation of the user expression, or an expiration time of the user expression.

8. The server of claim 7, wherein the at least one transceiver is further configured to:

receive a second response message including a status of at least one user expression from the gateway; and transmit the second response message to the terminal, wherein the status of at least one user expression is generated by the gateway which aggregates the at least one user expression received from at least one terminal.

9. The server of claim 7, wherein the request message for the user expression further includes at least one of: a name of a user interaction, an identifier of the user interaction, at least one item for the user interaction, identifier of at least one item, an uniform resource locator (URL) of at least one item, or a communication address of the user expression.

10. The server of claim 8, wherein the second response message includes at least one of: a name for a report of the user expression, an identifier for a report of the user expression, a description for a report of the user expression, a status for a report for the user expression, a number of participation of the user expression, at least one item for a report of the user expression, an identifier of the at least one item, an uniform resource locator (URL) of at least one item, a number of a user expression count, or a time of the user expression count.

11. The server of claim 7, wherein the information associated with the preference of the terminal includes an element regarding reception of the user expression.

12. The server of claim 11, wherein the at least one processor is configured to:

when the element regarding reception of the user expression is set to 'true', control the at least one transceiver to forward the request message to the terminal; and when the element regarding reception of the user expression is set to 'false', reject the request message.

13. A method for providing a user expression service in a communication system using a terminal, the method comprising:

receiving, from a server, a request message for a user expression of the terminal, in response to identifying that the terminal prefers to receive the request message for the user expression by the server;

identifying an input of the user expression; and transmitting, to the server, a response message including information about the user expression, wherein the request message for a user expression of the terminal is received according to a user preference document associated with the terminal stored in an XML document management server (XMDS), wherein the request message for the user expression includes at least one of a description about the user expression, a way for a participation of the user expression, or an expiration time of the user expression.

14. The method of claim 13 further comprising:

generating an interface for receiving the input of the user expression based on the request message; and displaying the interface on a screen, wherein the interface is generated based on a way for participation of the user expression included in the request message, and wherein the way for participation of the user expression includes at least one of: selecting an item, selecting a grade for an item, or inputting text.

15. The method of claim 13, wherein the information about the user expression includes at least one of: selectable items according to a way for participation of the user expression, selectable grades for each item, text data information, or preference information indicating whether a reception of a collection result for the user expression is preferred, and wherein the method further comprising receiving a collection result message from the server if the response message is configured such that the reception of the collection result for the user expression is preferred.

16. The method of claim 13, wherein the request message for a user expression of the terminal further includes at least one of: a name of a user interaction, an identifier of the user interaction, at least one item for the user interaction, identifier of at least one item, an uniform resource locator (URL) of at least one item, or a communication address of the user expression.

17. The method of claim 13, wherein the information about the user expression includes an element regarding reception of the user expression, wherein the request message is transmitted to the terminal from the server when the element regarding reception of the user expression is set to 'true', and wherein the request message is rejected by the server when the element regarding reception of the user expression is set to 'false'.

* * * * *